US007643966B2

(12) United States Patent
Adachi et al.

(10) Patent No.: US 7,643,966 B2
(45) Date of Patent: Jan. 5, 2010

(54) IDENTIFICATION OF 3D SURFACE POINTS USING CONTEXT-BASED HYPOTHESIS TESTING

(75) Inventors: Jeffrey Minoru Adachi, El Cerrito, CA (US); Mark Damon Wheeler, Oakland, CA (US); Jonathan Apollo Kung, Oakland, CA (US); Richard William Bukowski, Orinda, CA (US); Laura Michele Downs, Orinda, CA (US)

(73) Assignee: Leica Geosystems AG, Heerbrugg (CH)

( * ) Notice: Subject to any disclaimer, the term of this patent is extended or adjusted under 35 U.S.C. 154(b) by 491 days.

(21) Appl. No.: 11/075,167

(22) Filed: Mar. 8, 2005

(65) Prior Publication Data

US 2005/0216237 A1 Sep. 29, 2005

Related U.S. Application Data

(60) Provisional application No. 60/551,914, filed on Mar. 10, 2004.

(51) Int. Cl.
| | |
|---|---|
| G06F 17/00 | (2006.01) |
| G06F 19/00 | (2006.01) |
| G06K 9/46 | (2006.01) |
| G06K 9/52 | (2006.01) |
| G06K 9/62 | (2006.01) |
| G06K 9/64 | (2006.01) |
| G06K 9/68 | (2006.01) |
| G06T 15/00 | (2006.01) |
| G06T 15/10 | (2006.01) |
| G06E 1/00 | (2006.01) |
| G06G 7/00 | (2006.01) |
| G06K 9/20 | (2006.01) |
| G06K 9/00 | (2006.01) |

(52) U.S. Cl. .............. 703/1; 706/18; 706/20; 700/98; 700/103; 700/105; 700/182; 700/183; 345/419; 345/634; 382/154; 382/201; 382/204; 382/209; 382/210; 382/217; 382/218; 382/219; 382/220; 382/312; 382/318

(58) Field of Classification Search ............... 703/1; 345/419, 634; 382/154, 312, 321, 209–210, 382/201, 204, 217–220, 190; 706/18, 20; 700/98, 103–105, 182–183

See application file for complete search history.

(56) References Cited

U.S. PATENT DOCUMENTS 5,821,943 A * 10/1998 Shashua .................. 345/427

(Continued)

OTHER PUBLICATIONS

Arman et al. "Model-Based Object Recognition in Dense-Range Images—A Review", ACM computing Surveys, Mar. 1993, vol. 25, No. 1, pp. 5-43.*

(Continued)

*Primary Examiner*—Kamini S Shah
*Assistant Examiner*—Suzanne Lo
(74) *Attorney, Agent, or Firm*—Workman Nydegger

(57) ABSTRACT

A computer model of a physical structure (or object) can be generated using context-based hypothesis testing. For a set of point data, a user selects a context specifying a geometric category corresponding to the structure shape. The user specifies at least one seed point from the set that lies on a surface of the structure of interest. Using the context and point data, the system loads points in a region near the seed point(s), and determines the dimensions and orientation of an initial surface component in the context that corresponds to those points. If the selected component is supported by the points, that component can be added to a computer model of the surface. The system can repeatedly find points near a possible extension of the surface model, using the context and current surface component(s) to generate hypotheses for extending the surface model to these points. Well-supported components can be added to the surface model until the surface of the structure of interest has been modeled as far as is well-supported by the point data.

49 Claims, 6 Drawing Sheets

U.S. PATENT DOCUMENTS

| | | | |
|---|---|---|---|
| 6,230,066 B1* | 5/2001 | Sferro et al. | 700/104 |
| 6,298,152 B1* | 10/2001 | Ooenoki et al. | 382/181 |
| 6,771,840 B1* | 8/2004 | Ioannou et al. | 382/285 |
| 6,968,299 B1* | 11/2005 | Bernardini et al. | 703/2 |
| 2001/0040573 A1* | 11/2001 | Kressin | 345/421 |
| 2001/0047251 A1* | 11/2001 | Kemp | 703/1 |
| 2003/0067461 A1 | 4/2003 | Fletcher et al. | 345/420 |
| 2005/0089213 A1* | 4/2005 | Geng | 382/154 |
| 2005/0168460 A1* | 8/2005 | Razdan et al. | 345/419 |

OTHER PUBLICATIONS

InnovMetric Software, "Geometric Inspection of Small Components with CT-scanners", http://www.innovmetric.com, Oct. 5, 2004. 9 pages.*

InnovMetric Software, "Audi, BMW, DaimlerChrysler, and Renault Turn to Polyworks to Reduce the Time for CFD Analysis by up to 83%", http://www.innovmetric.com, May 7, 2004, 7 pages.*

Boyer et al. "The Robust Sequential Estimator: A General Approach and its Application to Surface Organization in Range Data" IEEE Transactions on Pattern Analysis and Machine Intelligence, vol. 16, No. 10, Oct. 1994, pp. 987-1001.*

Carla Nardinocchi et al., "Building extraction from LIDAR data," *IEEE/ISPRS, Joint Workshop on Remote Sensing and Data Fusion over Urban Areas*, Nov. 8-9, 2001, Piscataway, NJ, USA, IEEE, Nov. 8, 2001, pp. 79-83.

Marc Alexa et al., "Point Set Surfaces," *Proceedings Visualization 2001* (Cat. No. 01CH37269), *IEEE*, Piscataway, NJ, USA, (2001), pp. 21-28.

Ravi Ramamoorthi et al., "Creating Generative Models from Range Images," *Computer Graphics Proceedings, Annual Conference Series*, 1999, Aug. 1999, pp. 195-204.

Martin A. Fischler et al., "Random Sample Consensus: A Paradigm for Model Fitting with Applications to Image Analysis and Automated Cartography," *Communications of the ACM*, Jun. 1981, vol. 24, No. 6, pp. 381-395.

Paul J. Besl et al., "Invariant Surface Characteristics for 3D Object Recognition in Range Images," *Computer Vision, Graphics, and Image Processing*, (1986), vol. 33, pp. 33-80.

Adam Hoover et al., "An Experimental Comparison of Range Image Segmentation Algorithms," *IEEE Transactions on Pattern Analysis and Machine Intelligence*, Jul. 1996, vol. 18, No. 7, pp. 673-689.

Jianbo Shi et al., "Normalized Cuts and Image Segmentation," *IEEE Transactions on Pattern Analysis and Machine Intelligence*, Aug. 2000, vol. 22, No. 8, pp. 888-905.

* cited by examiner

Click and Drag Drag Mouse

Tile Continues    Occlusion Followed by Tile

Wall    Ledge    End

IDENTIFICATION OF 3D SURFACE POINTS USING CONTEXT-BASED HYPOTHESIS TESTING

CLAIM OF PRIORITY

This application claims priority to U.S. Provisional Patent Application No. 60/551,914, entitled "Identification of 3D Surface Points Using Context-Based Hypothesis Testing," filed Mar. 10, 2004, which is hereby incorporated herein by reference.

TECHNICAL FIELD OF THE INVENTION

The present invention relates to the identification of points that correspond to a particular object, such as points from a data set that lie on a surface of interest, as well as the generation of a model or representation of that object.

BACKGROUND

There are many ways to construct a computer model of a physical structure, such as by scanning the structure and generating a virtual model from the resultant scan data. These techniques become more complicated for large structures, such as a manufacturing facility or a petroleum refinery, which can have very complex surfaces due to the amount of piping, machinery, and other apparatus that would be present in the scan.

One technique for constructing these computer models begins by laser scanning the structure. In the laser scanning process, a laser beam scans across a view that encompasses the structure of interest. The scanning device measures a large number of points that lie on surfaces within an unobstructed line of sight of the scanning device. Each scan point has a measured location in 3D space, to within some measurement error, that typically is recorded relative to a point (x,y,z) in the local coordinate system of the scanner. The resulting collection of points is often referred to as one or more point clouds, where each point cloud can include points that lie on many different surfaces in the scanned view. For example, a scan taken at a petroleum refinery may include a point cloud that has points that correspond to pipes, elbows, valves, pumps, and structural steel members.

Once the 3D data for the points in the scan have been collected, the data typically are processed to generate a computer (virtual) model of the structure. One technique for processing the 3D point data is to group together points that lie on the same surface. The grouped points then are processed with a prior-art fit procedure that defines a surface consistent with the points. For example, the points that lie on the surface of a cylindrical storage tank can be grouped together, then processed by a prior-art fit procedure to construct a geometric model of the surface of the cylindrical tank.

One technique for grouping together the points that lie on the same surface, known as manual segmentation or point cloud partitioning, is to manually partition the points that appear to lie on the surface of interest into a group. For example, a user can select one or more groups of points and then draw a polygonal fence around the points that appear to lie on the surface of interest, while excluding points that lie on other surfaces. Once the fence is created and a group of points of interest is defined, the grouping process may need to be repeated to remove spurious points that do not lie on the desired surface. Since the view presented to the user is a 2D projection of 3D space, points that appear to be on the same surface in a 2D view may actually be on different surfaces. The user must then analyze the same scene from another view and manually partition the points that appear to lie on the surface of interest. The user typically can isolate points on the desired surface in one or two manual segmentation steps, but in some cases additional segmentation may be needed.

A fit procedure then is utilized to generate a geometric primitive of the surface of interest from the selected surface points. Once the primitive has been generated, fit statistics are reviewed. Frequently, the fit statistics fall below acceptable levels due to the inadvertent inclusion of points not on the surface of interest. When this occurs, the user must perform additional manual segmentation steps to remove these spurious points. As a result, this procedure for generating a computer model of a surface from 3D point data is a time-consuming and error-prone process.

In another prior art process, described in U.S. Pat. No. 6,771,840, entitled "APPARATUS AND METHOD FOR IDENTIFYING THE POINTS THAT LIE ON A SURFACE OF INTEREST," filed May 18, 2000, hereby incorporated by reference herein, points that lie on a surface of interest can be identified without need for the user to manually partition the points. Instead, the user can select at least one seed point that lies on the surface of interest. Points in vicinities of the seed points that are likely to lie on the same surfaces as the seed points can be added. The system considers a number of neighboring points, and identifies points to be added on the basis of a uniformity of spacing, using a predetermined spacing factor.

These points then undergo a fitting procedure to define a surface type, as well as a candidate surface. After the candidate surface has been defined, a second set of points is defined that includes the seed points. To the second set of points are added the points that are within a predetermined distance of the candidate surface. Following this, the second set of points is partitioned into groups of contiguous points and the candidate surface is redefined with the surface type and the groups of contiguous points that include the seed points. Once the second set of points has been partitioned into subgroups, a shrinking procedure is applied to each subgroup to remove boundary points. The candidate surface then is redefined using only subgroups that include the seed points. This process of partitioning and/or redefining can be iterated a predetermined number of times (as specified by the user) or until some convergence criteria is satisfied.

Problems with such an approach occur for many objects, where a surface of that object (such as piping in a factory) might span multiple geometric objects, including runs of straight, cylindrical pipe, connected by elbow and/or flange regions. A single geometric model as used in the prior art cannot be used to cover all the possible shapes and configurations of such an object. It would be necessary to separately model each portion of the object. This can be somewhat difficult, as point-by-point, grow-from-seed methods do not lend themselves to convenient user intervention.

Another problem arises with unordered data. Many prior art methods such as grow-from-seed methods or cluster-and-merge methods assume that data are collected from a single viewpoint and are properly ordered, such as in scanlines or in a 2D grid. This information is relied upon for estimating surface normals and identifying discontinuities. Problems arise, however, in situations such as where data are merged from multiple viewpoints and/or registered from multiple scans over the same portions of a surface. Typical orderings, such as scanlines and 2-D grids, may not be always applicable to data generated using methods such as GPS. In general, 3D points measured from different points of view may not have a clean 2D topology, due to factors such as measurement noise and point overlap. This can lead to data that never meet fit criteria or that provide incorrect results. Further, grid and scanline based methods, as well as methods based on merging adjacent regions having similar properties, are sensitive to occlusions, particularly "shadows" cast by other objects in the scene.

Another problem with these existing approaches is that point-by-point methods are forced to use full data density, even if not required by the application. There is no inherent sense of scale to guide point decimation. Derivative methods, including local curvature methods and methods depending on normal vectors, tend to degrade as the point spacing becomes small relative to the measurement noise in the data. Further, many existing algorithms require an estimate of the surface normal vector at each data point, which can be computationally intensive (especially on unordered data) and sensitive to point density, noise, and occlusions. While most of these methods can be applied to a subset of data points, there is no mechanism for using subset results to indicate which parts of the remaining data are likely to include continuations of the surface found. This leads to inefficient modeling of smaller portions of dense and/or large databases.

DETAILED DESCRIPTION

Systems and methods in accordance with embodiments of the present invention overcome deficiencies in existing approaches by changing the ways in which points lying on a surface of interest are identified. In particular, various embodiments can utilize context-based hypothesis testing to identify points lying on a surface of interest and model those points into a continuous surface model. In one embodiment, a user specifies only a single seed point and a global context. From this point and context, the system can determine an initial surface component that corresponds to that context, then extend that component to model the entire surface of interest.

Figure 1:
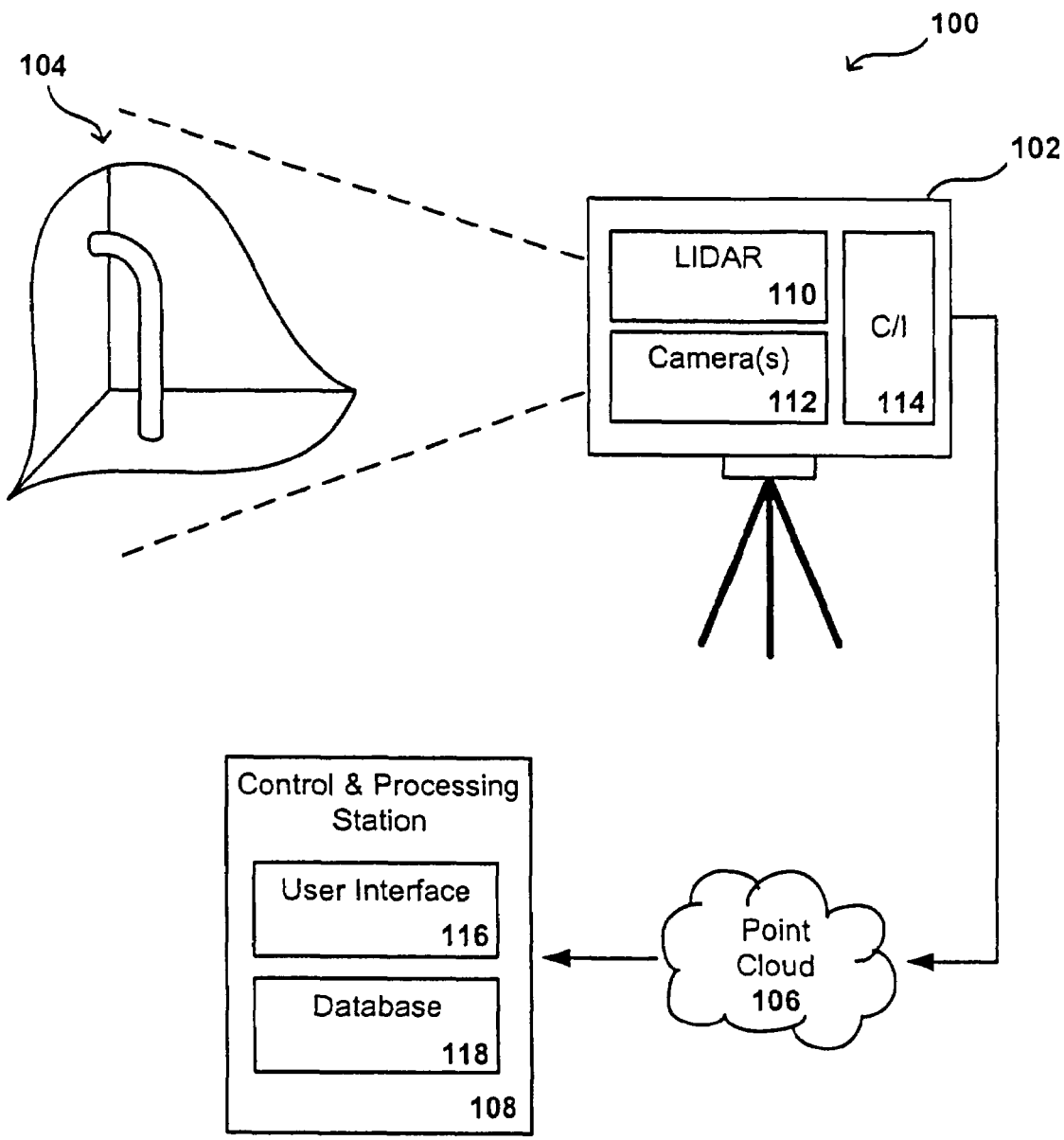
FIG. 1 is a diagram of a scanning LIDAR system that can be used to capture point data in accordance with one embodiment of the present invention.

Data relating to a physical object can be captured in any of a number of different ways, such as using a scanning LIDAR system as described, for example, in U.S. Pat. No. 5,988,862, filed Apr. 24, 1996, entitled "INTEGRATED SYSTEM FOR QUICKLY AND ACCURATELY IMAGING AND MODELING THREE DIMENSIONAL OBJECTS," which is hereby incorporated herein by reference. An example of a system 100 using a LIDAR system to capture data is shown in FIG. 1. This system utilizes a Field Digital Vision (FDV) module 102 that includes a scanning sensor for scanning an object 104, such as a pipe positioned in a corner of a room. The scanning sensor also can sense the position in three-dimensional space of selected points on the surface of the object 104. The FDV module 102 generates a point cloud 106 that represents the sensed positions of the selected points. The point cloud 106 also can represent other attributes of the sensed positions, such as reflectivity, surface color, and texture, where desired.

A control and processing station 108 interacts with the FDV 102 to provide control and targeting functions for the scanning sensor. In addition, the processing and control station 108 can utilize software to analyze groups of points in the point cloud 106 to generate a model of the object of interest 104. A user interface 116 allows a user to interact with the system, such as to view a two-dimensional (2D) representation of the three-dimensional (3D) point cloud, or to select at least one seed point from the cloud as will be discussed later herein. The processing station can include any appropriate components, such as standard computer and/or processing components. The processing station also can have computer code in resident memory, on a local hard drive, or in a removable drive or other memory device, which can be programmed to the processing station or obtained from a computer program product such as a CD-ROM or download signal. The computer code can include instructions for interacting with the FDV and/or a user, and can include instructions for undertaking and completing any modeling and/or scanning process discussed, described, or suggested herein.

The FDV 102 can include a scanning laser system (LIDAR) 110 capable of scanning points of the object 104, and that generates a LIDAR data signal that precisely represents the position in 3D space of each scanned point. The LIDAR data signal for the groups of scanned points can collectively constitute the point cloud 106. In addition, a video system 112 can be provided, which in one embodiment includes both wide angle and narrow angle CCD cameras. The wide angle CCD camera can acquire a video image of the object 104 and provides to the control and processing station 108, through a control/interface module 114, a signal that represents the acquired video image.

The acquired video image can be displayed to a user through a user interface 116 of the control and processing station 108. Through the user interface 116, the user can select a portion of the image containing an object to be scanned. In response to user input, the control and processing station can provide a scanning control signal to the LIDAR 110 for controlling the portion of the surface of the object that should be scanned by the LIDAR. More particularly, the scanning control signal can be used to control an accurate and repeatable beam steering mechanism that steers a laser beam of the LIDAR 110. The narrow angle CCD camera of the video system 112 can capture the intensity of the laser returned from each laser impingement point, along with any desired texture and color information, and can provide this captured information to the control and processing station 108. The control and processing station can include a data processing system (e.g., a notebook computer or a graphics workstation) having special purpose software that, when executed, instructs the data processing system to perform the FDV 102 control and targeting functions, and also to perform the model generation functions discussed elsewhere herein. Once the object has been scanned and the data transferred to the control and processing station, the data and/or instructions relating to the data can be displayed to the user. Alternatively, the user can select instructions before or during the LIDAR scan. If multiple scans are taken, these data sets can be combined or registered to form a single data set or point cloud as known in the art. After a single data set has been obtained, methods in accordance with various embodiments of the present invention can be used to process the data.

A process in accordance with one embodiment of the present invention uses a two-stage approach, including an initialization stage and an extension stage. The steps of an exemplary initialization stage process 200 will be described with respect to FIG. 2. In this initialization stage, a user can select a context to define the range of possible surface components, as well as any possible connections and the scale of the surface 202. A context generally is a set of possible surface components with a set of rules for connections, which can also include a set of ranges for scale. A surface component generally is a segment of the surface of interest, such as an elbow of a run of pipe or a square patch of a floor or wall. Once the context has been selected, the user can select an initial component type to be tested 204. A number of component options for the selected context can be displayed to the user, allowing the user to select at least one component that the user knows makes up a portion of the surface of interest.

In a piping context, for example, possible surface components in a context can include elbows, straight pipe, tees, flanges, reducers, and valves. A rule for connection in a piping context might be that the components are co-axial and of the same diameter at the point of connection. The range of dimensions can come from a data library or the particular schedule of pipe being used.

In an exemplary floor context, the components can include small square tiles or elongated flooring boards. The rules for connection in a flooring context might be that connected components are either coplanar or orthogonal, such as at the junction with a wall or stair, and that only components in the plane of the initial component can be extended. These rules allow determining the extent of a floor by identifying the location of the walls (components orthogonal to the initial component) without requiring full modeling of the walls. The scale of the tiles can reflect the density of the data and the dimensions of the surface to be modeled.

Figure 2:
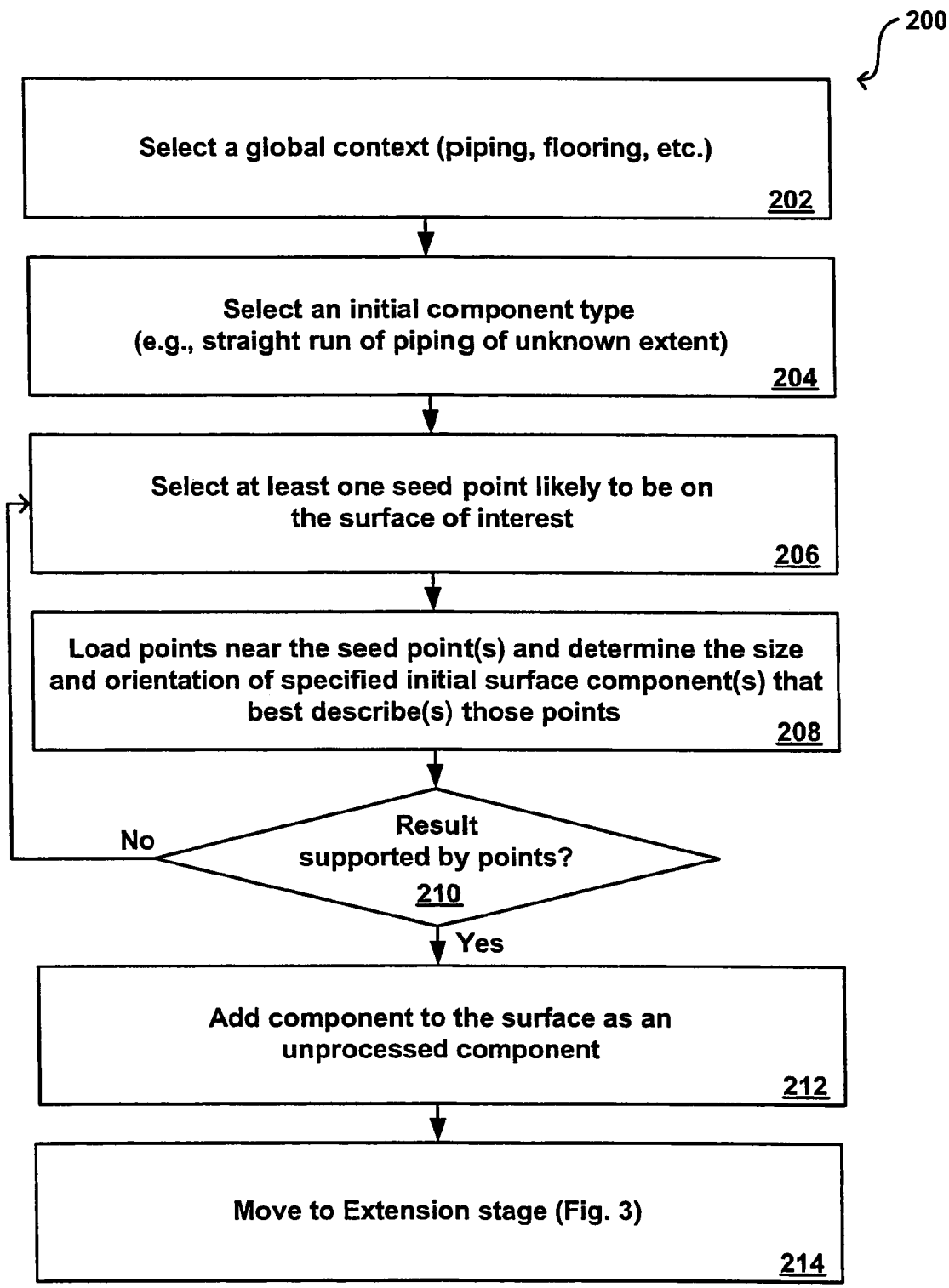
FIG. 2 is a flowchart showing steps of an initialization stage in accordance with one embodiment of the present invention.

The user then can provide one or more seed points, or "hint" points, for the initial surface component 206. For instance, the user can be displayed a 2D representation of the 3D point cloud and can select at least one point from the point cloud using an appropriate selection device, such as a computer mouse or stylus as known in the art. If the user selected an initial component type, it can be beneficial to select the seed point(s) from within an area of that component type. The data processing system then can select and utilize representative points in a localized 3D region of space near the seed point(s) can be used to find the dimensions, position, and orientation of an initial surface component that best matches those points 208. A determination can be made as to whether the result is supported by the points 210. If so, the component can be added to the surface as an unprocessed component 212 and the system can move to the extension stage 214. If the result is not supported by the points, a number of different options can exist. These options can include selecting at least one new seed point, such as is shown in the example of FIG. 2, as well as selecting a different initial component type or allowing the system to attempt to automatically determine the initial component type using only the context and an initial seed point, steps which are not shown in the example of FIG. 2.

Figure 3:
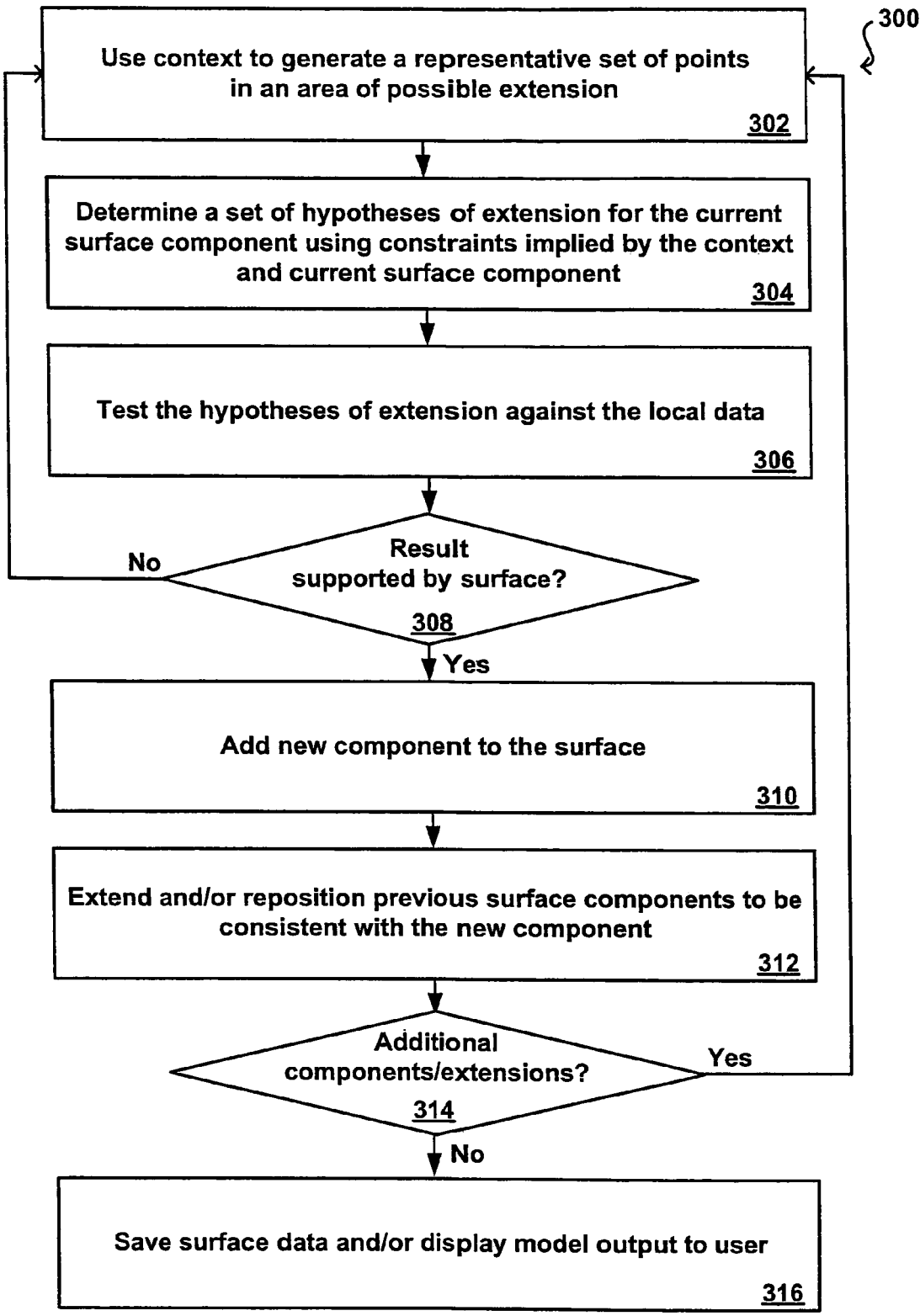
FIG. 3 is a flowchart showing steps of an extension stage in accordance with one embodiment of the present invention.

Once at least one initial component type has been added to the surface, the system can move to an extension stage process 300, an example of which will be described with respect to FIG. 3. In the extension stage, the surface can be iteratively extended as far as supported by the data points and the context. In each iteration, the context can be used to generate a representative set of points that are in an area of possible extension for the current component 302. The data processing system also can determine a set of hypotheses of extension for the current surface component 304. The process of finding a hypothesis best supported by the data can be simplified using the context and current surface component to limit the involved points by location and/or appropriate density. Also, the dimension of the local hypothesis testing problem can be reduced using the constraints implied by the context and/or current component. The hypotheses can be tested against the local data 306. A determination can be made as to whether the result of the hypothesis testing is supported by the points of the surface 308. If the result is adequately supported, the best hypothesis can be added to the surface as a new component 310. If the results are not supported by the points, a number of options exist, such as moving on to the next area of possible extension as shown in the example of FIG. 3, as well as using a different context or manually selecting the next component type, steps not shown in FIG. 3. When a new component is added to the surface, adjustments can be made to the positions and/or extents of previous surface components in order to make those surface components consistent with the new component 312. A determination can be made (either manually or automatically) as to whether extensions and/or additional components need to be added to the surface 314. If so, the next iteration of the extension process can begin from the new component. If not, the surface data and/or model can be saved to a database and/or displayed to a user 316. The display can consist of a graphical representation and/or a description of the surface. A description of the surface can consist of a list of surface component types, as well as the corresponding positions, orientations, and dimensions. The surface points can be described as a list of points associated with each surface component or, more compactly, as a deviation tolerance about each surface component. In the latter case, the surface points can be considered to be all those points that are within the specified deviation tolerance of the surface components.

EXAMPLE PROCEDURE

In order to better understand the systems and methods in accordance with embodiments of the present invention, the following presents an example using such a process, which is not intended to be a limitation on the processes or applications that can be used with those processes.

Figure 4A:
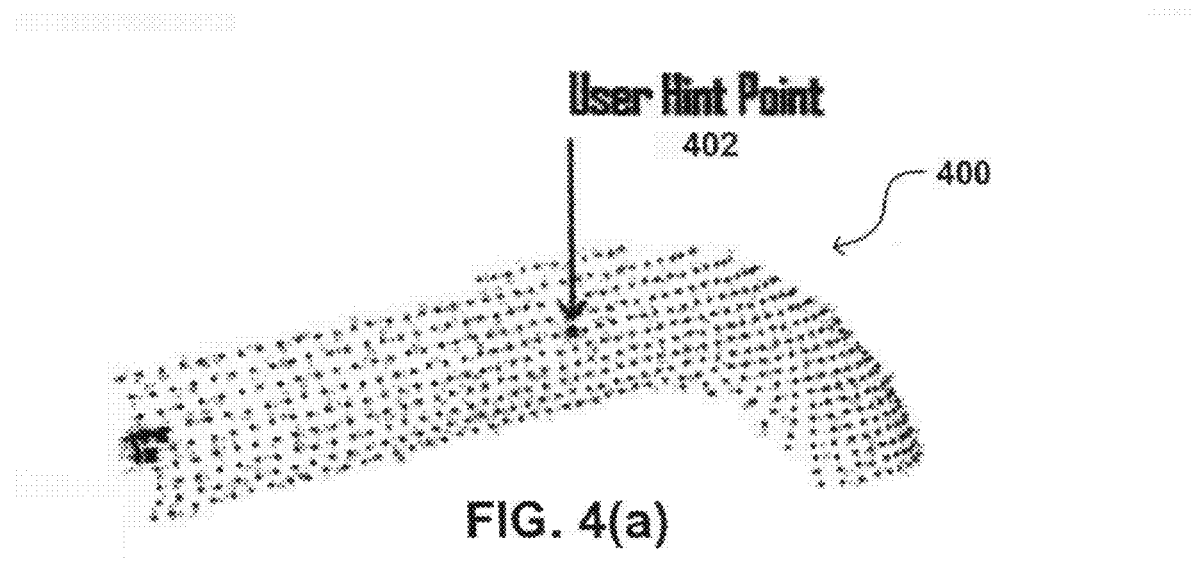
FIG. 4 is a diagram showing (a) a point set for a surface of an object and (b), (c) attempts to fit a surface component type to the point set in accordance with one embodiment of the present invention.

In this example, a corner of a facility is scanned that has a pipe of interest, similar to what is shown in FIG. 1. After the data are captured, and any registration or combination of the data is complete, a display of the point cloud produced by the scan can be displayed to the viewer, such as the point cloud 400 shown in FIG. 4(*a*). The user can select a global context that corresponds to the object of interest in the view, or from the point cloud. The global context can be selected from a library of contexts that can be contained in a database, for example, containing general contexts such as piping, flooring, or other potential surface types. The use of context can provide for a reduction in the number of dimensions needed to fit surface components to points. In general, matching a 90° pipe elbow to points can have nine degrees of freedom: three for position, three for rotation, one for the radius of the pipe, one for the radius of the elbow bend, and one for the length of the elbow. Using context provides constraints implied by the previous pipe, such as the elbow necessarily having approximately the same diameter as, and be coaxial with, the previous pipe at the point of connection. In this case, adding an elbow to the end of the previous pipe has only four degrees of freedom: one for the radius of the elbow bend, one for the length of the pipe, one for the length of the elbow and one for the rotation about the axis of the pipe.

Once the global context has been determined, a list or display of potential initial surface component types can be displayed to the user. For instance, a user selecting a piping context might select a straight pipe component of unspecified dimensions/extent, or an elbow component of specific dimensions. Alternatively, a user can choose not to specify the initial surface class type, in which case, all possible surface component types in the context can be tested. Whether or not the user selects a component type, the user can view a 2D display of the 3D data, and can select from the point cloud 400 at least one seed point 402 that is likely to lie on the surface of interest. A user also can select at least one seed point that corresponds to the surface of interest, and that can correspond to any surface component type specified by the user.

Figure 4B:
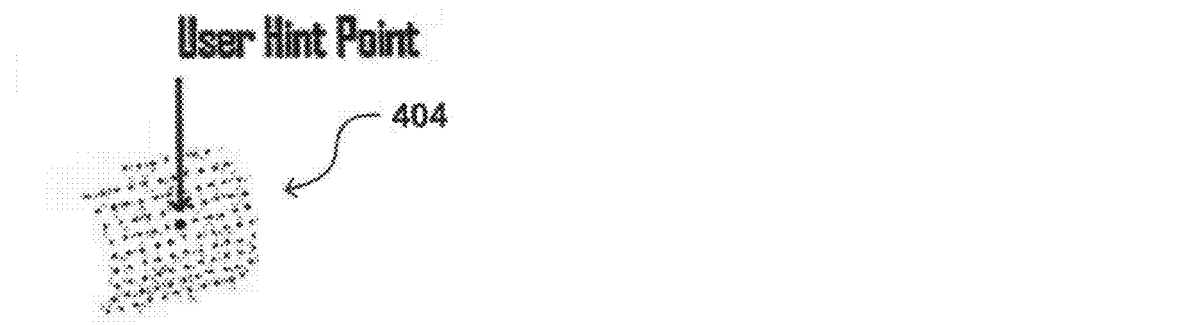

Local points 404 near the seed point(s) then can be found by using spatial queries, as shown in FIG. 4(b). A spatial query can request points in a localized 3D region of space, which can be limited by a maximum spatial density and/or a maximum point count. The region of space can be specified using a geometric bound, such as inside a ball, inside a cube, inside a convex polyhedron, or between two spheres. When a maximum point density is used, the density can provide a bound on the distance between the points returned by the query and those points that were filtered out. Such a bound can ensure that the points being examined are representative of all the points in the region of interest.

Since any set of points can be organized for spatial queries, such an approach can avoid problems with the processing of unordered data otherwise encountered when using various grow-from-seed methods. Filtering by point density alone may not avoid problems experienced by point-by-point and derivative methods when processing dense data, as discussed above. While any set of points can be decimated, an appropriate target density must be specified in at least one embodiment, as no single density will work for all applications. Since the target density in this approach can be provided by the context that defines the relevant scale, this approach can avoid problems with processing dense data.

Figure 4C:
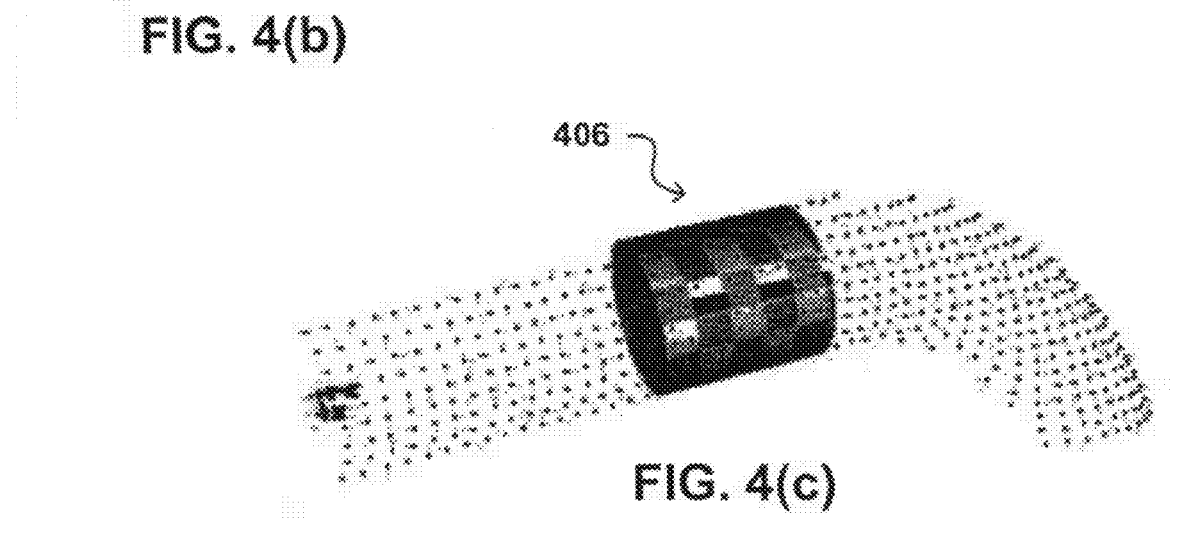
Figure 6A:
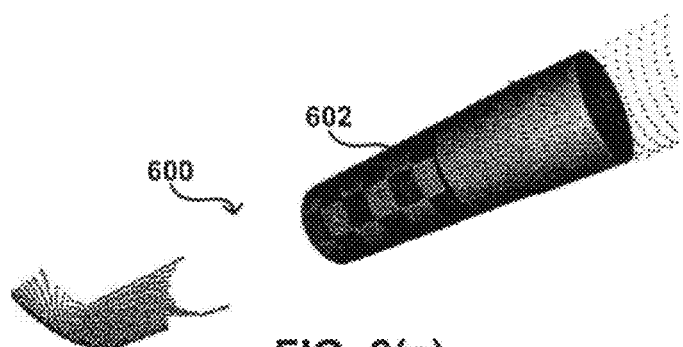
FIGS. 6(*a*) and 6(*b*) are diagrams showing a method for manually extending a component in accordance with one embodiment of the present invention.

The dimensions and orientation of the specified initial surface component that best describes the points near the hint point(s) can be determined, to produce an initial surface component 406 that corresponds to the nearby points as shown in FIG. 4(c). A method such as a random sample consensus (RANSAC) method as known in the art can be used effectively to find the model, given the robust nature of such a method with respect to missing data, such as is shown at the end of the pipe in FIG. 6(a). A RANSAC method uses a simple random sample consensus algorithm for robust fitting of models in the presence of many data outliers. Such an approach avoids concerns with occlusions discussed earlier. Such a method also can be robust with respect to noise, including noise due to inaccurate measurements of points on the surface of interest, as well as accurate measurements of points on other surfaces. The standard form of RANSAC method returns a model that describes the greatest number of the local points, within some specified deviation tolerance. When the local points involve only the initial surface component (e.g., points on a segment of straight pipe) this criteria can be sufficient. In ambiguous cases, the user hint point(s) can be incorporated to make RANSAC more efficient.

The use of a RANSAC method also allows for the easy processing of unordered data due to the registration of multiple data scans. Such an approach can take advantage of higher information in regions of overlap between multiple scans from different perspectives. Algorithms requiring data organized in grids or scanlines only can process data from a single view point. When two or more point data sets are registered, or stitched together, into a single cloud, there can be regions in which multiple clouds overlap. This overlap can provide information about connectivity that does not otherwise exist in any single view.

One step of an exemplary RANSAC method involves sampling a random sampling of points from the local points. When the user hint point(s), assumed to be on the surface of interest, are used in place of the randomly chosen points, the RANSAC method can require less computation to find the desired surface. If the user specifies enough hint points, there may be no ambiguity as the surface of interest can be completely specified. For example, depending on the spatial orientation of the hints, three hint points can specify a plane, four hint points can specify a sphere, and six hint points can specify a cylinder. A RANSAC method can provide a single framework for incorporating any number of user hint points, with additional hint points providing improved performance.

At this point, a test can be done to determine the adequacy of the initial hypothesis. If the result of the RANSAC (or other appropriate) method is not adequately supported by the points, in that the result does not meet certain goodness of fit or other appropriate criteria, then no adequate surface was found. Since the user specifies the initial surface component type, the null hypothesis is the only available hypothesis. More robust statistical tests can be formulated when dealing with point data that include measurement error, such as hypothesis testing using confidence intervals on the variance of the residual errors.

If the initial hypothesis passes the adequacy test, the component from the RANSAC process can be added to the surface and marked as unprocessed. There can be a number of unprocessed components added to the surface, with each unprocessed component going through at least a portion of those steps outlined above.

Figure 5A:
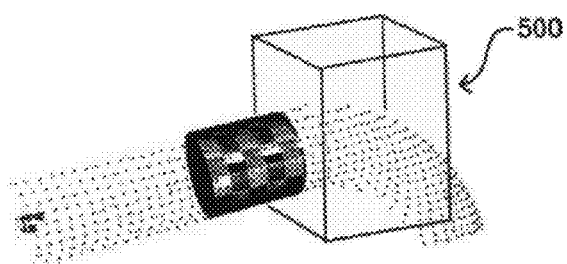
FIGS. 5(*a*)-(*e*) are diagrams showing attempts to extend a component in accordance with one embodiment of the present invention.

From the unprocessed components of the surface, a current component can be selected. The current component then can be extended, where possible. The context can be used to help find all possible directions for extending the current component. For each possible direction of extension, local points that are in the area of the extension 500, such as shown in FIG. 5(a), can be loaded. Spatial queries can be used as discussed elsewhere herein. The region of space can be determined by the rules for extending the current component, such as the region near an end of a pipe. For instance, the surface can be grown on multiple fronts simultaneously, such as a pipe surface growing in both directions when encountering a tee in the run of pipe. At a minimum, keeping track of multiple frontiers of the surface can eliminate the need for the user to remember unexplored directions and manually return to those directions to restart the growing procedure. Perhaps more significantly, this ability to grow on multiple frontiers can be exploited to reduce processing time in parallel processor implementations.

By narrowing the search space to a localized 3D region, problems with modeling portions of large databases can be avoided. Retrieving the points needed at any step by efficiently querying and filtering points in a localized 3D region of space limits the computer memory requirement to manageable size, no matter how dense the points are locally or how many points are in the point data, avoiding prior art problems with performance degradation and the requirements for point-neighbor relations.

The context can suggest search regions that are neither cubic nor spherical as might be suggested by the usual sense of "nearness." When growing a finite surface such as a sphere, the region of interest can be a region that is within some deviation tolerance of the sphere, as defined by the current component. When growing a surface such as a floor with square tiles, each having sides of length L, it might be appropriate to query a region with dimension L×L×D, where D is a deviation tolerance specified in the context. A positive value of D can allow sampling points on any existing walls, but a value of D less than L can reduce the number of points requiring processing. In the case of pipe, it may even be desirable to evaluate different hypotheses on different shaped regions.

To avoid problems with the efficient handling of dense point data, various embodiments allow the density to be limited based on the scale of the current component. For example, if the current component is a pipe having a 1 m diameter, it can be sufficient to limit the point spacing to no less than 10 mm for testing hypotheses. This filtering by point density can reduce the computational effort by orders of magnitude with current laser scanners, which can use constant angular spacing, causing surfaces close to the scanner to be sampled much more densely than surfaces far from the scanner. Each time a point query is made, then, there can be a context with a scale that allows appropriate decimation of the point data.

Figure 5B:
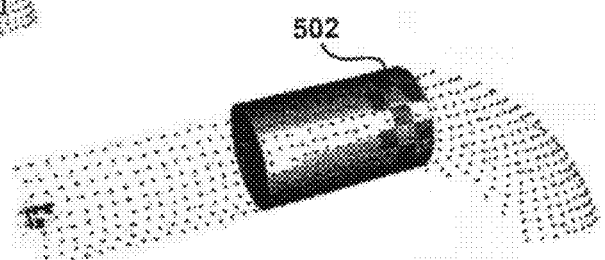
Figure 5C:
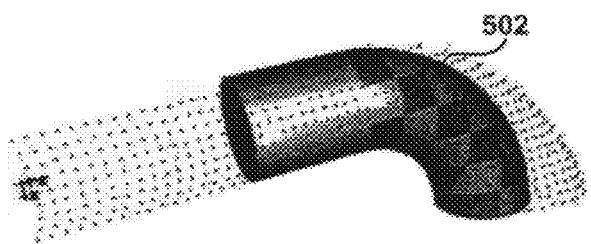

There can be a number of possible hypotheses for extensions 502 of a pipe, such as are shown being tested in FIGS. 5(b) and 5(c). These can include, for a straight pipe:
coaxial straight pipe—same diameter
occlusion followed by coaxial straight pipe
elbow
flange
tee—connected at stem
tee—connected at one arm
reducer
reducing elbow
mitered corner
valve
plane
end of pipe If the current component is a straight pipe of 1" diameter, for example, the hypotheses could include elbows, flanges, tees, reducers and valves of 1" diameter at the connection and co-axial at the connection. Planes also can be useful as terminations to a run of pipe as the pipe runs into a wall or box. When the wall is not orthogonal to the pipe, explicitly modeling the plane can facilitate the modeling of mitered pipe ends. Compared to using only the points on the pipe to define its extent, modeling the oblique plane is likely to give a more accurate angle and position for the end to a pipe. Some applications may not use all of the components, such as handrails that do not utilize flanges. Some hypotheses also can be conditioned on previous surface components. For example, two flanges in a row might be allowed, as this is a common use, but three or more flanges might not be allowed. In this case, the hypothesis list of the second flange would not include another flange. In the case of simple geometric components like cylinders, an occlusion followed by additional surface can be considered a hypothesis, since extrapolation over a gap can be well defined. Such a context can include a parameter indicating the maximum gap size that can be spanned.

Figure 7:
FIG. 7 is a diagram showing potential patch hypotheses in accordance with one embodiment of the present invention.
Figure 7:
Figure 7:
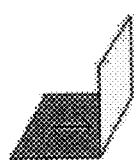
Figure 7:
Figure 7:

In a floor context, the hypotheses of a floor tile can include coplanar adjacent tiles, occlusions followed by coplanar floor tiles, perpendicular wall tiles defining either walls or ledges, and an end hypothesis, such as are shown in FIG. 7. Any coplanar tile can be extendable. If a user is not interested in modeling the walls, the wall tiles can be set so as to not be extendable. These wall tiles can still be used to set the extent of the floor tiles.

In a tubular handrail context, the hypothesis of a straight tube segment might include a continuing straight tube, elbows, tees, floor tiles, and wall tiles. If the user is only interested in the modeling the handrail, neither the wall tiles nor the floor tiles would be extendable, but could be used to set the extent of the handrail pipes.

For each extension hypothesis of the current component, all relevant constraints can be identified that are implied by the context and previous surface components. In a piping context, for example, the constraints can specify that the new and current components are coaxial and of the same diameter at the point of connection. In a floor or wall context, the constraints can include that connected components are within some tolerance of coplanar or perpendicular. In a rail track context, the constraints can include that rail ties are perpendicular to and below the rail track. A stair or ladder context can include a constraint that successive rungs or steps are parallel and equally spaced. In this case, constraints imposed by the context can involve multiple previous surface components, although those previous components need not necessarily be connected.

Figure 5D:
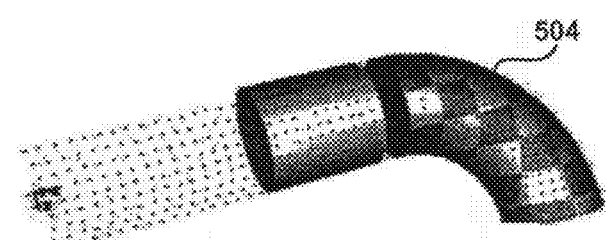

At this point the dimensions and orientation that are most consistent with the local points and the constraints can be identified, such as is shown for the extension component 504 in FIG. 5(d), and a determination can be made as to how strongly the points support the hypothesis. A standard RANSAC approach can return the model that describes the most points, within some specified deviation tolerance. Point counts can suffice to distinguish between points on the surface of interest and points on other surfaces. It is possible, however, for two hypotheses to explain the same number of points. For example, a plane and a large cylinder may pass within the same tolerance of all points on a narrow flat strip. Ad hoc rules can be devised to break ties in these degenerate cases. For example, a penalty can be assigned for model complexity so that the simpler component is favored. Alternatively, the points on a cylinder can be required to cover some minimal portion of the circumference.

When dealing with point data that include measurement error, more robust statistical tests can be formulated. For example, a plane can be fit to a set of points when deciding whether to accept a cylinder model of a set of points. Since a plane is a special (degenerate) case of the cylinder, the errors of the points relative to the cylinder model can be expected to have smaller variance than the errors relative to plane model. If the variance of the cylinder errors is within a 90% confidence interval of the variance of the plane model, a conclusion can be made that the cylinder does not offer improvement that is statistically significant. Thus, the plane model could be selected over the cylindrical model.

Figure 5E:
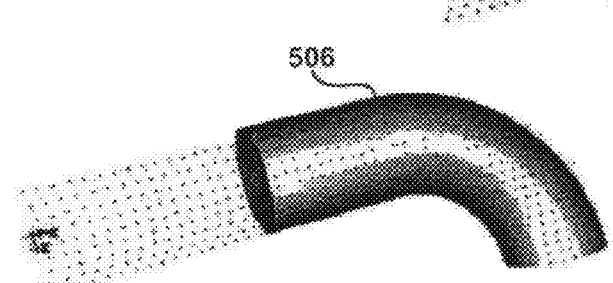

If the best hypothesis is adequately supported by the points, the component can be added to the surface as an unprocessed component. The pose and extent of previous surface components can be as needed to be consistent with new surface component, as the additional information can yield greater precision. For example, adding an elbow at the end of a straight pipe segment can require the extent of the straight pipe segment to be adjusted, in order to be consistent with the elbow. As seen in FIGS. 5(d) and 5(e), this can require extending the straight pipe component to reach the elbow component 504 in order to form a contiguous pipe 506. When adding two straight segments of pipe, all of the associated points can be used to obtain an axis estimate that is more precise than could be found for two segments separately.

Figure 6B:
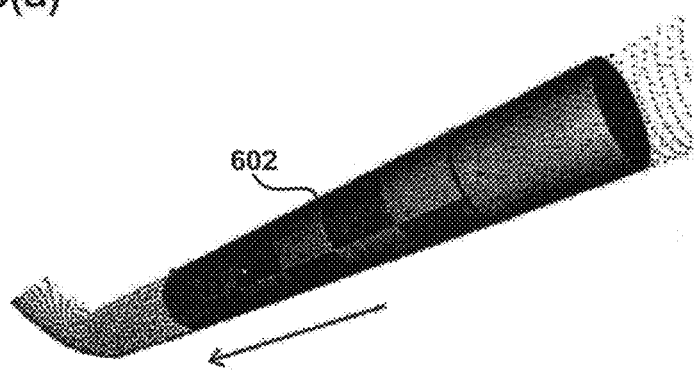

If a system graphically displays the results, the display can be updated to reflect the new surface component and any adjustments to old surface components. A graphical representation of the hypothetical surface components overlaid on the points can be displayed at each iteration of the method. The view point can be adjusted automatically to focus the newest component as the surface grows. This approach removes the need for the user to manually navigate through the data points in order to monitor progress of the method or add hints as needed when the method is unable to proceed. At this point, the component can be marked or designated as processed. If there are additional components, the process can be repeated for those components. The user interface for the system can allow the user to request interruption of the growth of the surface. This can be useful where the user is interested in modeling only a portion of an object, such as a portion of a run of pipe. Alternatively, if the user can see that the surface is incorrect, the user can stop growing the surface, adjust the context, and start over. The interface also can allow a user to intervene in order to adjust the extent of surface components. For example, if the method stops at the end of what appears to be the end of a pipe, a graphical display can allow a user to see that the data on the pipe 602 were occluded, forming a point gap 600, and that the pipe continued some distance away as shown in FIG. 6(*a*). In this case, the user can extend the last pipe segment, such as by using a computer mouse to click on the end of the pipe segment and drag the edge of the segment until the pipe overlaps points on the far side of the occlusion as shown in FIG. 6(*b*). The updated surface component then can be used to continue growing the surface on the far side of the occlusion. Allowing the user to force extensions of components can avoid problems in existing systems with handling obstructions or occlusions. It also can be faster and easier on the user to allow user intervention on the scale of the surface components, rather than on a point-by-point scale as in existing systems. Many existing algorithms require that there be no gaps in the data on a surface, as missing even a single scanline can be enough to stop the growth of the surface. This can be problematic since it is common to have data in which objects cast shadows on other objects. Since a RANSAC method only looks at points on the scale of the surface component, methods in accordance with the present invention can be insensitive to occlusions smaller than the scale of the surface components. The extrapolation across occlusions can be done using extrapolation rules and occlusion hypothesis in the context, or through manual intervention as discussed above.

A user can be allowed to modify the current context, such as by specifying additional components or removing existing components from an existing context. The user also can specify a new context. For example, a user might want to start modeling a wall after modeling of the floor is finished. Walls can be a different context, as walls can have unique features such as windows and doors that generally are not present in a floor. The user can transition directly into modeling the wall, allowing the method to take advantage of related information that has already been found. For example, while finding the extent of the floor, the method may have identified some points on the walls. These points can be used in place of new user hint points to speed up the process, as well as to limit the need for additional user input. Systems also can provide for the automated changing of context, using rules that can be established by the user. For example, the user can establish a rule that the system should automatically start modeling the walls once the floor has been modeled. The user can also specify that once the walls and ceiling are modeled, the modeling can continue on the windows, stairs, or hand rails. Essentially, this introduces a meta-context for switching between contexts.

The user also can be allowed to interactively add or remove points from consideration. Mechanisms can be provided that allow for simple user specification of point subsets, such as through the use of polygonal fences. These mechanisms can be applied by the user to manually define points as "on" or "off" the surface of interest. Since no method can be expected to be 100% correct, this approach can be used to provide an option of recourse in the case of misclassified points.

Once the surface components have been identified, the system can output and/or display a list of surface components, including the positions and orientations of those components, along with the associated points (if desired) and any connections. This description of the surface can be much more compact than in previous approaches, which require a dense triangulation of the surface points. Since the connections between components are a by-product of the surface growing process, this approach also avoids prior art problems with negligible extra computation. A further benefit is that a relational model of surface components can be produced, such as a model for an ordered run of pipe, rather than a collection of unrelated pipe pieces as would be available in existing systems. These embodiments allow for a compact classification of points as either surface points or non-surface points. Instead of a list of possibly billions of points on the surface, the results can be summarized with a constraint such as "all data points within a specified tolerance of a list of simple geometry," where that simple geometry includes shapes such as cylinders, planes, spheres, and cones. This classification can be desirable to simplify viewing of the data on a computer, as the rendering of such surface components can take much less computational effort than the rendering of millions to billions of individual points on a surface.

Although embodiments of the present invention are described with respect to scan data of architectural objects, advantages of a three-dimensional modeling system can be obtained for a wide variety of other applications and systems. The data need not be obtained from scanning, but can be captured from any of a number of three-dimensional measurement or detection techniques. The data also can be generated using software or other data generation means.

When used with construction, design, or building applications, the embodiments discussed herein can be used to identify and model a number of different objects, which can include objects such as: runs of pipe (including elbows, tees, flanges, reducers, valves); roads; road curbs; center dividers; guard rails; utility poles (including common scale, orientation, and spacing); utility lines; parking meters (including common scale and orientation, as well as relation to curb); lamp posts; fence posts; tunnels; rail tracks and ties; structural steel; bolts and connectors; walls, floors, and ceilings (including doors and windows); HVAC ducts (including variable dimension/proportion cross section); conduit (where building codes specify bend and connector parameters); wiring; stairs; ladders; hand rails; architectural columns; planks in wooden boats; spheres (such as registration targets, storage tanks); boxes; surfaces made up of a small number of components with known connections; and surfaces comprised of repeating units (that may not be connected in the normal sense).

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of modeling a physical structure, comprising the steps of:
    allowing a user to select a context corresponding to the physical structure, wherein the physical structure is a construction, building, or facility structure, and at least one seed point from a set of point data corresponding to a surface of the structure, the context defining a set of possible surface component options with a set of rules for connection;
    once the context is selected, allowing the user to select a component option from the set of component options presented to the user;
    using the context and the selected component options to select local points near the at least one seed point and determine dimensions and orientation of an initial surface component that models the local points, the initial surface component being added to a working model of the physical structure;
    determining a set of extension points near an area of possible extension of the initial surface component using the context and rules for connection;
    determining a set of extension hypotheses to be tested against the set of extension points using the context, the set of rules for connection and the initial surface component to determine any additional surface components to be added to the working model;
    adding, using a processor, the additional surface components to the working model;
    adjusting, using a processor, the position and/or extent of a previous surface component such that the previous surface component is consistent with the additional surface components, forming a contiguous structure; and
    displaying the working model to the user.

2. A method according to claim 1, further comprising: adjusting any other model surface components to correspond to the additional surface components.

3. A method according to claim 1, further comprising: displaying the set of point data to the user.

4. A method according to claim 1, further comprising: updating the working model after the addition of the initial surface component and any additional surface component.

5. A method according to claim 1, further comprising: allowing the user to specify the type of the initial surface component corresponding to the at least one seed point.

6. A method according to claim 1, further comprising: allowing the user to interrupt the modeling method at any time.

7. A method according to claim 1, further comprising: obtaining the set of point data corresponding to the physical structure.

8. A method according to claim 7, wherein: the step of obtaining the set of point data includes using a scanning LIDAR system to capture the set of point data.

9. A method according to claim 7, wherein: the step of obtaining point data includes combining data from multiple sources including at least one of LIDAR scanners, Global Positioning System (GPS), photogrammetry, mechanical digitizers, and 3-D point data sources.

10. A method according to claim 1, wherein: the context selected by the user includes information selected from the group consisting of a set of possible surface components, rules for component connections, rules for component extensions, and ranges of allowed dimensions.

11. A method according to claim 1, further comprising: using spatial queries to locate the local points near the at least one seed point.

12. A method according to claim 1, further comprising: using a random sample consensus approach to determine the initial surface component and any additional surface components.

13. A method according to claim 1, further comprising: using spatial queries to locate the set of extension points.

14. A method according to claim 1, further comprising: allowing the density of points used to determine the additional components to be limited based on the scale of the initial surface component and any additional surface components.

15. A method according to claim 1, further comprising: allowing the user to modify the context by at least one of specifying new surface components and removing existing surface components from the context.

16. A method according to claim 1, wherein: the context includes surface components selected from the group consisting of elbows, straight pipe, tees, flanges, reducers, valves, square tiles, and elongated planks.

17. A method according to claim 1, wherein: the context includes rules for connecting surface components.

18. A method according to claim 17, wherein: the rules for connection include rules selected from the group consisting of co-axial connections, common diameter connections, coplanar connections, and orthogonal connections.

19. A method according to claim 1, wherein: the set of extension hypotheses includes hypotheses selected from the group consisting of coplanar adjacent tiles, occlusions followed by coplanar floor tiles, perpendicular wall tiles defining either walls or ledges, an end hypothesis, a continuing straight tube, an elbow, a tee, and a wall tile.

20. A method according to claim 1, wherein: the set of points includes points that lie on more than one surface.

21. A method of modeling a physical structure, comprising the steps of:
    obtaining a set of point data corresponding to the physical structure wherein the physical structure is a construction, building, or facility structure;
    allowing a user to select a context corresponding to the physical structure, and at least one seed point from the set of point data, the context defining a set of possible surface component options with a set of rules for connection;
    selecting an initial surface component that models point data near the at least one seed point, the initial surface component being added to a working model of the physical structure; and
    iteratively adding additional surface components to the working model until a final model of the structure is generated by:
        using the context to determine a set of extension points near an area of possible extension of the working model, using the context, initial surface component, and any additional surface components to determine a set of component hypotheses for extending the surface, testing the set of extension hypotheses against the set of extension points whereby supported components are added to the working model, adjusting, using a processor, the initial surface component and any additional surface components of the working model to correspond to the newly added supported components forming a contiguous structure; and displaying the final model to the user.

22. A method according to claim 21, wherein: the set of point data is obtained from laser scan data.

23. A method according to claim 21, wherein:

the step of obtaining the set of point data includes combining data from multiple sources including one or more of LIDAR scanners, Global Positioning System (GPS), photogrammetry, mechanical digitizers, or 3-D point data sources.

24. A method according to claim 21, wherein:

the step of selecting the initial surface component includes using a spatial query to form a set of local points near the seed point, testing each component in the selected context against the local points, and selecting the surface component that best models the local points.

25. A method according to claim 21, wherein:

the step of selecting the initial surface component includes allowing the user to select the initial component from the context, using a spatial query to form a set of local points near the seed point, and determining the position, orientation, and dimensions of the surface component that best models the local points.

26. A computer-readable medium having computer-executable instructions for performing a method of modeling a physical structure, wherein the physical structure is a construction, building, and facility structure, the method comprising:

allowing a user to select a context corresponding to the physical structure, the context defining a set of possible surface components with a set of rules for connection and constraints for the selection of extension points;

once the context is selected, allowing the user to select a component option from a number of component options presented to the user;

selecting at least one seed point from a set of point data corresponding to a surface of the structure;

using local points near the at least one seed point to determine dimensions and orientation of an initial surface component that models the local points, and adding the initial surface component to a working model of the physical structure;

iteratively adding additional surface components to the working model forming a contiguous structure until a final model of the structure is generated, each iteration using the context and the selected component option or a subsequently selected component option to determine a set of extension points near an area of possible extension of the working model, the context, initial surface component, and any additional surface components being used to determine a set of component hypotheses for extending the surface, the set of extension hypotheses being tested against the set of extension points such that supported surface components are added to the working model, the initial surface component and any additional components of the working model being adjusted to correspond to newly added supported surface components, until a final model of structure is generated; and saving the final model to a database.

27. A system for modeling a physical structure, comprising:

a memory storing a set of point data corresponding to a surface of the structure;

a database component maintaining a database containing a set of surface contexts, each surface context containing a list of potential surface components, wherein each potential surface component includes constraints for the selection of extension points; and a user interface component configured to:

communicate with the database, and allow a user to select a context corresponding to the physical structure from the set of surface contexts, and at least one seed point from the set of point data, wherein the physical structure is a construction, building, or facility structure;

a processing station configured to perform a method including the steps of:

receive the selected context and at least one seed point from the user interface;

use the selected context to select local points near the at least one seed point and determine dimensions and orientation of an initial surface component that models the local points, the initial surface component being added to a working model of the physical structure;

use the context to determine a set of extension points near an area of possible extension of the working model;

use the context, the initial surface component, and any surface components in the working model to determine a set of extension hypotheses to be tested against the set of extension points to determine any additional surface components to be added to the working model;

iteratively add the additional surface components to the working model until a final model of the structure is generated, forming a contiguous structure;

adjusting the position and/or extent of previously added surface components such that the previous surface components are consistent with each iteratively added additional surface component; and save the final model to the database.

28. A system according to claim 27, wherein: the user interface is configured to display the set of point data to the user.

29. A system according to claim 27, wherein: the user interface is configured to display the working model to the user and update the working model after the addition of the initial surface component and any additional surface component.

30. A system according to claim 27, wherein: the user interface is configured to allow the user to specify the type of the initial surface component corresponding to the at least one seed point.

31. A system according to claim 27, wherein: the user interface is configured to allow the user to interrupt the modeling method at any time.

32. A system according to claim 27, wherein: the processing station is configured to obtain the set of point data corresponding to the physical structure.

33. A system according to claim 27, further comprising:
a scanning LIDAR system in communication with the processing station and operable to capture the set of point data.

34. A system according to claim 27, wherein: the user interface is configured to display the final model to the user.

35. A system according to claim 27, wherein: the user interface is configured to display a description of the final model to the user, the description containing a list of surface component types, as well as corresponding positions, orientations, and dimensions.

36. A system according to claim 27, wherein: the processing station is configured to use spatial queries to locate the local points near the at least one seed point.

37. A system according to claim 27, wherein: the processing station is configured to use a random sample consensus approach to determine the initial surface component and any additional surface components.

38. A system according to claim 27, wherein: the processing station is configured to use spatial queries to locate the set of extension points.

39. A system according to claim 27, wherein: the processing station is configured to allow the density of points from the set of points, used to determine the additional components, to be limited based on the scale of the initial surface component.

40. A system according to claim 27, wherein: the user interface is configured to allow the user to modify the context by at least one of specifying new surface components and removing existing surface components from the context.

41. A method of modeling a physical structure, comprising the steps of:
scanning the physical structure to acquire a set of point data corresponding to the physical structure, wherein the physical structure is a construction, building, or facility structure;
displaying the set of point data to a user and allowing the user to select a context corresponding to the physical structure, the context defining a set of possible surface components each with a set of rules for connection;
allowing the user to select at least one seed point from the set of point data corresponding to a surface of the structure;
using the context to select local points near the at least one seed point and determine dimensions and orientation of an initial surface component that models the local points, the initial surface component being added to a working model of the physical structure;
using the context to determine a set of extension points near an area of possible extension of the initial surface component;
using the surface model and the context to determine a set of hypotheses for extending the surface, the set of hypotheses being tested against the set of extension points to determine any supported surface components to be added to the working model;
adding, using a processor, supported surface components to the working model and adjusting, using a processor, the initial surface component and any other model components to correspond to the newly added supported surface components, forming a contiguous structure, until a final model of the structure is generated; and
saving the final model to a database.

42. A method according to claim 41, wherein:
the physical structure is scanned using at least one of LIDAR scanning, GPS, photogrammetry, mechanical digitizers, and 3-D point data sources.

43. A method according to claim 1, further comprising:
adding the additional surface components to the working model until a final model of the structure is generated.

44. A method according to claim 43, further comprising:
saving the final model to a database.

45. A method according to claim 43, further comprising:
displaying the final model to the user.

46. A method according to claim 43, further comprising:
displaying a description of the final model to the user, the description containing a list of surface component types, as well as corresponding positions, orientations, and dimensions.

47. A method of modeling a physical structure, comprising:
allowing a user to select a context corresponding to physical structure wherein the physical structure is a construction, building, or facility structure, wherein the context includes a set of possible surface components and rules for connections;
allowing a user to select at least one seed point from a set of point data corresponding to a surface of the structure;
selecting local points near the at least one seed point using the context and the rules for connections;
determining dimensions and orientation of an initial surface component that models the local points, the initial surface component being selected from the set of possible surface components and added to a working model of the physical structure;
adding, using a processor, an additional surface component to the working model using the context and rules for connections;
adjusting, using a processor, the position and/or extent of the initial surface component such that the initial surface component is consistent with the additional surface component forming a contiguous structure; and
displaying the working model to the user.

48. A method according to claim 47, wherein:
the context selected by the user also includes rules for component extensions and/or ranges of allowed dimensions.

49. A system for modeling a physical structure, comprising:
a memory;
a display;
a processor programmed to:
store in the memory a set of point data corresponding to a surface of the physical structure, wherein the physical structure is a construction, building, or facility structure, and a database containing a set of surface contexts, each surface context containing a list of potential surface components with a set of rules for connection;
allow a user to select a context corresponding to the physical structure from the set of surface contexts, and at least one seed point from the set of point data;
receive the selected context and at least one seed point;
use the selected context and rules for connection to select local points near the at least one seed point and determine dimensions and orientation of an initial surface component that models the local points, the initial surface component being added to a working model of the physical structure;
use the context to determine a set of extension points near an area of possible extension of the working model;
use the context, the initial surface component, and any surface components in the working model to determine a set of extension hypotheses to be tested against the set of extension points to determine any additional surface components to be added to the working model;

iteratively add the additional surface components to the working model until a final model of the structure is generated;

as the additional surface components are added, confirm the position and extent of previously added surface components such that the previously added surface components are consistent with the additional surface components forming a contiguous structure;

display the final model to the user; and save the final model to the database.

* * * * *

UNITED STATES PATENT AND TRADEMARK OFFICE
CERTIFICATE OF CORRECTION

PATENT NO. : 7,643,966 B2  Page 1 of 1
APPLICATION NO. : 11/075167
DATED : January 5, 2010
INVENTOR(S) : Adachi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 700 days.

Signed and Sealed this

Sixteenth Day of November, 2010

David J. Kappos
*Director of the United States Patent and Trademark Office*